US012802307B2

(12) United States Patent
Wang et al.

(10) Patent No.: US 12,802,307 B2
(45) Date of Patent: Nov. 17, 2026

(54) ELECTRONIC APPARATUS AND WALLPAPER GENERATION METHOD THEREOF

(71) Applicant: Acer Incorporated, New Taipei City (TW)

(72) Inventors: Chieh-Sheng Wang, New Taipei City (TW); Wen-Cheng Hsu, New Taipei City (TW); Shih-Hao Lin, New Taipei City (TW); Chi-Kang Lee, New Taipei City (TW)

(73) Assignee: Acer Incorporated, New Taipei City (TW)

( * ) Notice: Subject to any disclaimer, the term of this patent is extended or adjusted under 35 U.S.C. 154(b) by 134 days.

(21) Appl. No.: 18/909,928

(22) Filed: Oct. 8, 2024

(65) Prior Publication Data

US 2025/0285218 A1 Sep. 11, 2025

(30) Foreign Application Priority Data

Mar. 6, 2024 (TW) ................................ 113108225

(51) Int. Cl.

*G06T 19/00* (2011.01)
*G06T 3/4046* (2024.01)
*G06T 11/60* (2006.01)
*G06F 3/14* (2006.01)

(52) U.S. Cl.

CPC ............ *G06T 11/60* (2013.01); *G06T 3/4046* (2013.01); *G06T 19/006* (2013.01); *G06F 3/1446* (2013.01); *G06T 2210/22* (2013.01)

(58) Field of Classification Search

None

See application file for complete search history.

(56) References Cited

U.S. PATENT DOCUMENTS

2011/0090248 A1 4/2011 Xiang
2015/0309687 A1* 10/2015 Herigstad ............ H04N 21/478 715/784
2019/0197994 A1* 6/2019 Kunitomo ................ G09G 5/37

FOREIGN PATENT DOCUMENTS

| | | | |
|---|---|---|---|
| CN | 113379866 | | 9/2021 |
| CN | 113986168 | A | 1/2022 |
| CN | 114972018 | A | 8/2022 |
| TW | 200417830 | A | 9/2004 |
| TW | 200714032 | A | 4/2007 |

OTHER PUBLICATIONS

Zeng et al., "Aggregated Contextual Transformations for High-Resolution Image Inpainting", 2023. (Year: 2023).*

* cited by examiner

*Primary Examiner* — Nicholas R Wilson
(74) *Attorney, Agent, or Firm* — JCIPRNET

(57) ABSTRACT

An electronic apparatus and a wallpaper generation method thereof are provided. The method includes the following steps. An original image is obtained. An arrangement layout position and a display specification parameter of a plurality of display apparatuses are detected. A target image resolution is determined according to the arrangement layout position and the display specification parameter of each of the display apparatuses. The original image is augmented into a target augmented image having the target image resolution using an image restoration model. A wallpaper displayed at each of the display apparatuses is generated by cropping the target augmented image.

9 Claims, 9 Drawing Sheets

ELECTRONIC APPARATUS AND WALLPAPER GENERATION METHOD THEREOF

CROSS-REFERENCE TO RELATED APPLICATION

This application claims the priority benefit of Taiwan application serial no. 113108225, filed on Mar. 6, 2024. The entirety of the above-mentioned patent application is hereby incorporated by reference herein and made a part of this specification.

BACKGROUND OF THE INVENTION

Field of the Invention

The invention relates to an electronic apparatus, and in particular to an electronic apparatus and a wallpaper generation method thereof.

Description of Related Art

With the advancement of science and technology, powerful performance and abundant applications have made electronic apparatuses indispensable items for modern people's daily lives. Generally, these electronic apparatuses may display the user's desired wallpaper via the display, thereby improving the aesthetics of the electronic apparatuses and achieving the effect of apparatus personalization.

Currently, when the user wants to change the display wallpaper of the display, after lastly finding a desired image, often, since the image resolution does not match the screen resolution, the image needs to be manually edited so that the wallpaper display result may meet the user's expectations. This manual image editing process is quite inconvenient and time-consuming for the user. Moreover, when the user uses a plurality of displays, if they want these displays to display wallpapers of a similar style, they need to spend more time looking for other images of similar styles.

SUMMARY OF THE INVENTION

Accordingly, the invention proposes an electronic apparatus and a wallpaper generation method thereof that may solve the above technical issues.

An embodiment of the invention provides a wallpaper generation method. The method includes the following steps. An original image is obtained. An arrangement layout position and a display specification parameter of a plurality of display apparatuses are detected. A target image resolution is determined according to the arrangement layout position and the display specification parameter of each of the display apparatuses. The original image is augmented into a target augmented image having the target image resolution using an image restoration model. A wallpaper displayed at each of the display apparatuses is generated by cropping the target augmented image.

An embodiment of the invention provides an electronic apparatus including a storage apparatus and a processor. The processor is coupled to the storage apparatus and configured to execute the following operation. An original image is obtained. An arrangement layout position and a display specification parameter of a plurality of display apparatuses are detected. A target image resolution is determined according to the arrangement layout position and the display specification parameter of each of the display apparatuses. The original image is augmented into a target augmented image having the target image resolution using an image restoration model. A wallpaper displayed at each of the display apparatuses is generated by cropping the target augmented image.

Based on the above, in an embodiment of the invention, the original image may be augmented into the target augmented image having the target image resolution using the image restoration model, wherein the target image resolution is determined according to the arrangement layout position and the display specification parameter of each of the display apparatuses. Therefore, the target augmented image may be cropped based on the arrangement layout position and the display specification parameter of each of the display apparatuses to generate the wallpaper displayed at each of the display apparatuses. Accordingly, wallpaper images that match the resolution and the layout configurations of the plurality of display apparatuses may be dynamically generated. The user no longer needs to perform time-consuming manual image editing or image searching, thereby improving user experience.

DESCRIPTION OF THE EMBODIMENTS

Figure 1A:
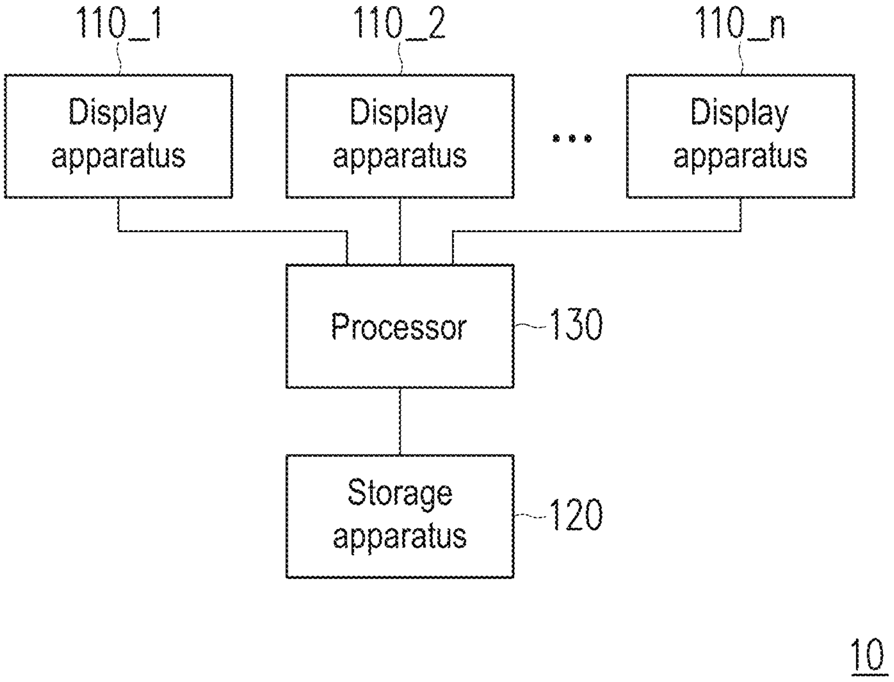
FIG. 1A is a block diagram of a multi-screen display system according to an embodiment of the invention.

A portion of the embodiments of the invention is described in detail hereinafter with reference to figures. In the following, the same reference numerals in different figures should be considered to represent the same or similar elements. The embodiments are only a portion of the invention, and do not disclose all possible implementation modes of the invention. Rather, the embodiments are merely examples of methods and apparatuses within the scope of the invention.

FIG. 1A is a block diagram of a multi-screen display system according to an embodiment of the invention. Referring to FIG. 1A, a multi-screen display system 10 includes a plurality of display apparatuses 110_1 to **110_*n*, a storage apparatus 120, and a processor 130. The disclosure does not limit the number of the plurality of display apparatuses 110_1 to 110_*n*. In addition, in some embodiments, one of the plurality of display apparatuses 110_1 to 110_*n* may be implemented with the storage apparatus 120 and the processor 130 as an electronic apparatus having a display function. In some embodiments, the plurality of display apparatuses 110_1 to 110_*n*** may also be connected in series in a daisy chain topology, but the invention is not limited thereto.

Figure 1B:
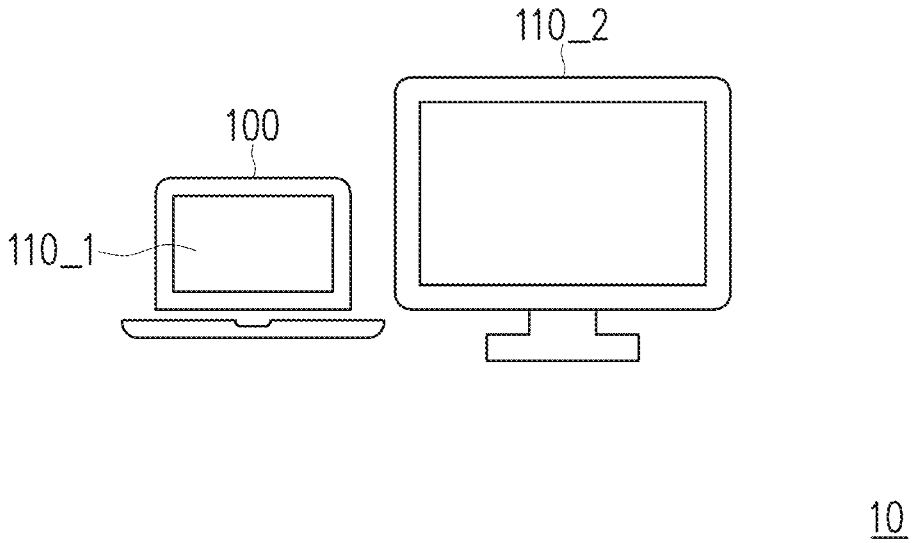
FIG. 1B is a schematic diagram of a multi-screen display system according to an embodiment of the invention.

For example, FIG. 1B is a schematic diagram of a multi-screen display system according to an embodiment of the invention. Please refer to the implementation example of FIG. 1B, which takes the number of the plurality of display apparatuses 110_1 to 110_2 as two as an example. The display apparatus 110_1 may be implemented with the storage apparatus 120 and the processor 130 as an electronic apparatus 100 having a display function. The electronic apparatus 100 is, for example, a tablet computer, a notebook computer, a desktop computer, an all-in-one computer, etc., and the disclosure is not limited thereto. The display apparatus 110_2 may be connected to the electronic apparatus 100 via a wired or wireless transmission interface. For example, the transmission interface is a DP transmission interface, an HDMI transmission interface, a USB-C transmission interface, or a WiFi transmission interface, etc.

The display apparatuses 110_1 to **110_*n*** are, for example, liquid-crystal displays (LCD), light-emitting diode (LED) displays, organic LEDs (OLED), or other types of displays, and the invention is not limited in this regard.

The storage apparatus 120 is used to store data and data such as a software module (such as an operating system, an application, a driver) for access by the processor 130 and may be, for example, any type of fixed or removable random-access memory (RAM), read-only memory (ROM), flash memory, hard disk, or a combination thereof.

The processor 130 is coupled to the plurality of display apparatuses 110_1 to **110_*n* and the storage apparatus 120. The processor 130 is, for example, a central processing unit (CPU), an application processor (AP), or other programmable general-purpose or special-purpose microprocessors, digital signal processors (DSPs), programmable controllers, application-specific integrated circuits (ASICs), programmable logic devices (PLDs), graphics processing unit (GPUs), or other similar devices, or a combination of the devices. The processor 130 may execute the program codes, software modules, commands, etc. recorded in the storage apparatus 110** to implement the dynamic wallpaper display method of an embodiment of the present application.

Figure 2:
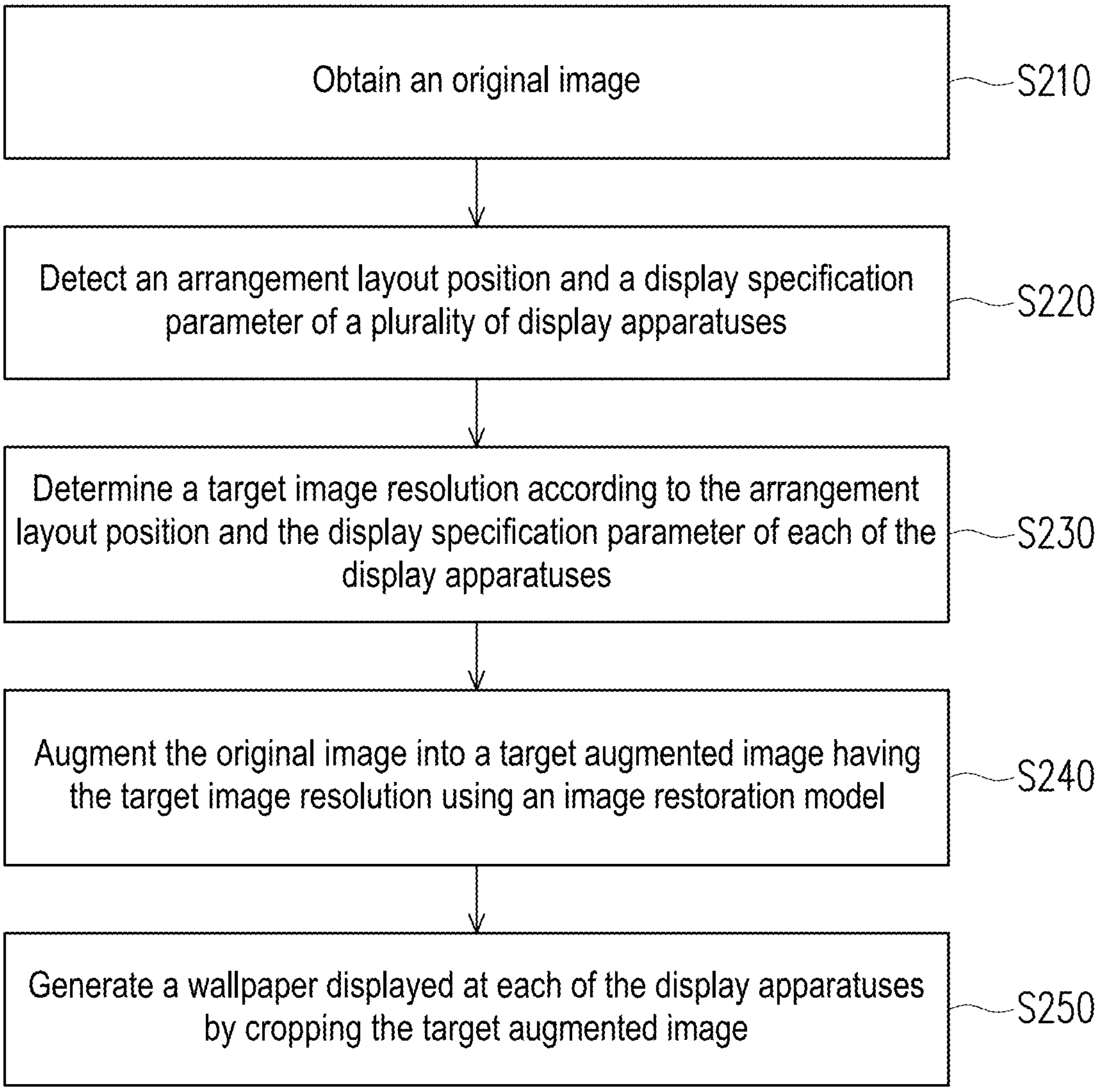
FIG. 2 is a flowchart of a wallpaper generation method according to an embodiment of the invention.

FIG. 2 is a flowchart of a wallpaper generation method according to an embodiment of the invention, and the method flow of FIG. 2 may be implemented by each element of the multi-screen display system 10 of FIG. 1A. Please refer to FIG. 1A and FIG. 2 at the same time. The steps of the wallpaper generation method of the present embodiment is explained below with the various elements of FIG. 1A.

In step S210, the processor 130 obtains an original image. The disclosure does not limit the resolution of the original image. The original image may be a photo, a default wallpaper image built into the electronic apparatus 100, or any image downloaded by the user from the Internet.

In some embodiments, the processor 130 may also generate a plurality of candidate images with different image styles or similar image styles according to a reference image, and select an original image from the plurality of candidate images according to user instructions. For example, the processor 130 may input a reference image into a trained image style transfer model to generate these candidate images. Accordingly, the diversity of wallpapers of the plurality of display apparatuses 110_1 to **110_*n*** may be improved.

In step S220, the processor 130 detects the arrangement layout positions and the display specification parameters of the plurality of display apparatuses 110_1 to **110_*n*. In some embodiments, the display specification parameters include screen resolution and screen size. In different embodiments, the screen resolutions and the screen sizes of these display apparatuses 110_1 to 110_*n* may be the same or different from each other. For example, in FIG. 1B, the screen resolution of the display apparatus 110_1 may be 1920×1080, and the screen size of the display apparatus 1101 may be 15.6 inches. Moreover, the screen resolution of the display apparatus 110_2 may be 1920×1080, and the screen size of the display apparatus 1101** may be 24 inches. However, this is only used as an example, and the disclosure is not limited thereto.

In addition, the processor 130 may identify the arrangement layout method of these display apparatuses 110_1 to **110_*n* to obtain the arrangement layout position of each of the display apparatuses 110_1 to 110_*n*. For example, in FIG. 1B, the arrangement layout method of the display apparatuses 110_1 to 110_2 is side by side, but may be not limited thereto. In other words, the processor 130 may recognize that the display apparatus 110_2 is located at the right side of the display apparatus 110_1. For example, the processor 130 may obtain the arrangement layout position of each of the display apparatuses 110_1 to 110_*n*** via a specific Windows API provided by the Windows operating system.

In step S230, the processor 130 determines a target image resolution according to the arrangement layout position and the display specification parameter of each of the display apparatuses 110_1 to **110_*n*. That is, the processor 130 may determine the range of image augmentation content that needs to be additionally generated based on the arrangement layout position and the display specification parameter of each of the display apparatuses 110_1 to 110_*n*. For example, it is assumed that the display apparatuses 110_1 to 110_2 are arranged side by side and the screen sizes and the screen resolutions of the display apparatuses 110_1 to 110_2 are all the same. The processor 130 may multiply the width of the screen resolution by 2 to obtain the width of the target image resolution (meaning that the processor 130 needs to generate image augmentation content in the horizontal direction), and set the height of the target image resolution equal to the height of the screen resolution. Next, in step S240, the processor 130** augments the original image into a target augmented image having the target image resolution using an image restoration model.

Figure 3:
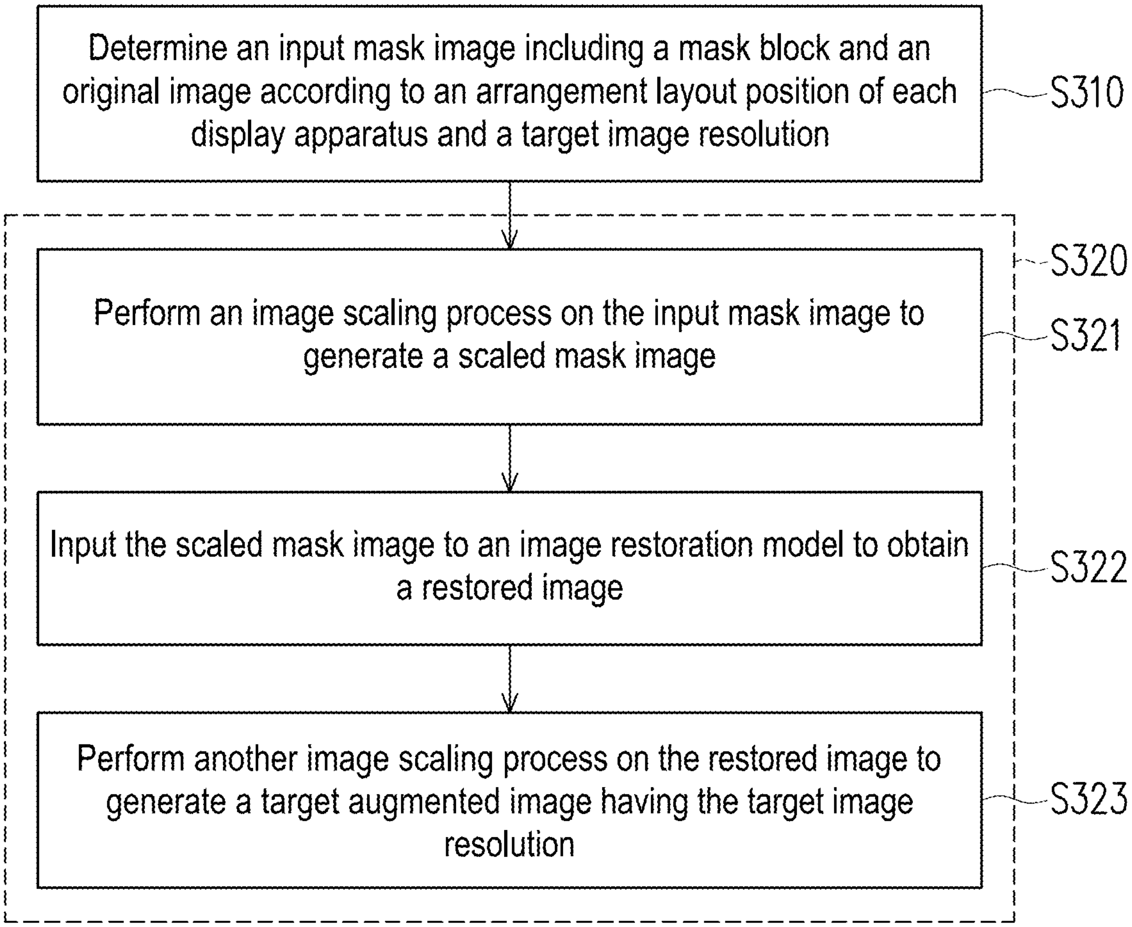
FIG. 3 is a flowchart of generating a target augmented image according to an embodiment of the invention.
Figure 4:
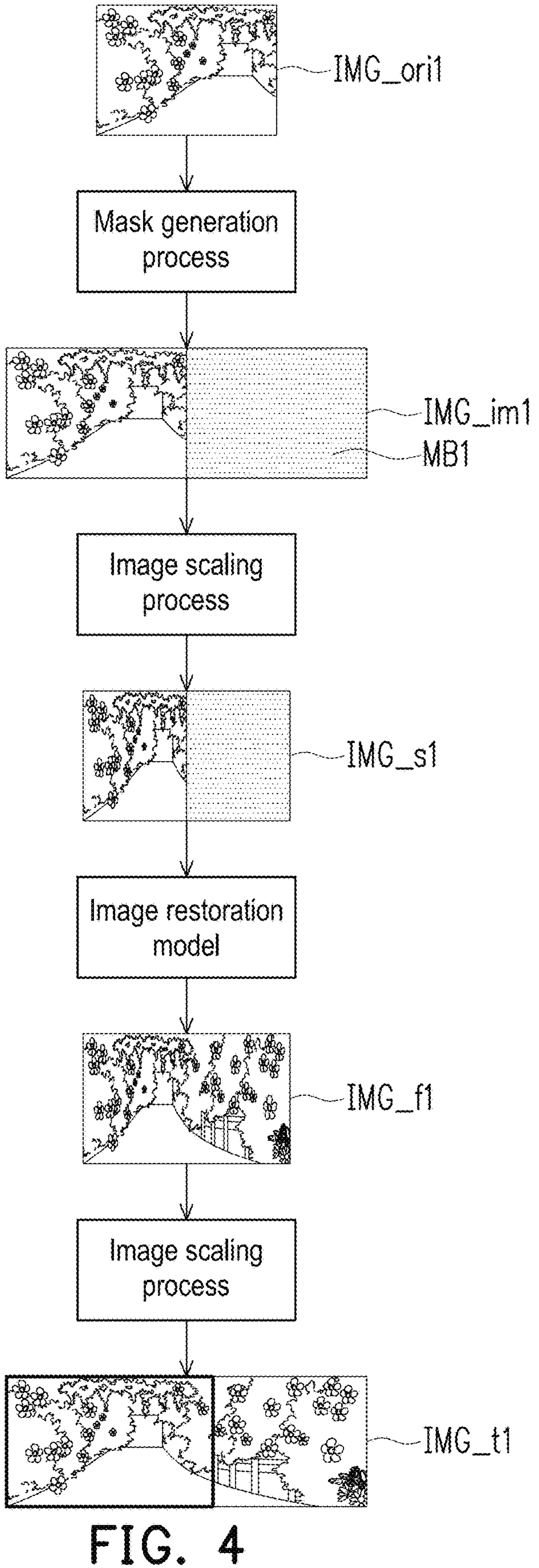
FIG. 4 is a schematic diagram of generating a target augmented image according to an embodiment of the invention.

In some embodiments, FIG. 3 is a flowchart of generating a target augmented image according to an embodiment of the invention. In order to clearly illustrate the implementation principle of the invention, the following is supplemented by FIG. 4. FIG. 4 is a schematic diagram of generating a target augmented image according to an embodiment of the invention. Please refer to FIG. 3 and FIG. 4.

In step S310, the processor 130 determines an input mask image IMG_im1 including a mask block MB1 and an original image IMG_ori1 according to the arrangement layout position and the target image resolution of each of the display apparatuses 110_1 to **110_*n*. The mask block MB1 represents the block that needs to be image-filled by the image restoration model. It may be known that after the target image resolution is determined, the block range of the mask block MB1 may be determined based on the resolution of the original image IMG_ori1 and the arrangement layout position of each of the display apparatuses 110_1 to 110_*n***.

In other embodiments, the processor 130 may first capture a partial image block from the original image. Next, the processor 130 determines an input mask image including a mask block and a portion of the image block of the original image according to the arrangement layout position and the target image resolution of each of the display apparatuses 110_1 to **110_*n***. That is, the input mask image only includes a portion of the image block of the original image, and the remaining portions are all mask blocks.

Next, in step S320, the processor 130 restores the input mask image IMG_im1 into a target augmented image IMG_t1 using the image restoration model. In the present embodiment, step S320 may be implemented as step S321 to step S323.

In step S321, the processor 130 performs an image scaling process on the input mask image IMG_im1 to generate a scaled mask image IMG_s1. That is, the processor 130 first scales the input mask image IMG_im1 into a model input format that conforms to the image restoration model.

In step S322, the processor 130 inputs the scaled mask image IMG_s1 to the image restoration model to obtain a restored image IMG_f1. An image restoration model is a deep learning model used to fill in missing, damaged, or incomplete portions of an image. The image restoration model is typically based on convolutional neural networks (CNN) or generative adversarial networks (GAN) that may learn to infer the content of missing regions from the context of the image. In addition, in some embodiments, the processor 130 may also input a text content to the image restoration model, so that the image restoration model fills the image according to the text content. For example, the processor 130 may generate the restored image IMG_f1 using a Stable Diffusion model and an inpainting ControlNet model. In some embodiments, the above text content may be input by the user. In some other embodiments, the processor 130 may generate the text content according to the original image using an image-generated text model.

In step S323, the processor 130 performs another image scaling process on the restored image IMG_f1 to generate the target augmented image IMG_t1 having the target image resolution. That is, the processor 130 may scale the restored image IMG_f1 conforming to the model output format into the target augmented image IMG_t1 having the target image resolution.

In some embodiments, the processor 130 may also overlay the original image IMG_ori on the target augmented image IMG_t1 to ensure that the target augmented image IMG_t1 includes the original content of the original image IMG_ori1, so as to alleviate the phenomenon that multiple image scaling processes may cause image quality to deteriorate.

In step S250, the processor 130 generates a wallpaper displayed at each of the display apparatuses 110_1 to **110_*n* by cropping the target augmented image IMG_t1. That is, the target augmented image IMG_t1 is cropped to generate a wallpaper of each of the display apparatuses 110_1 to 110_*n***. It is expected that compared to directly enlarging and then blurrily displaying the original image at each of the display apparatuses, the wallpaper image of an embodiment of the disclosure has better quality and is clearer.

Figure 5A:
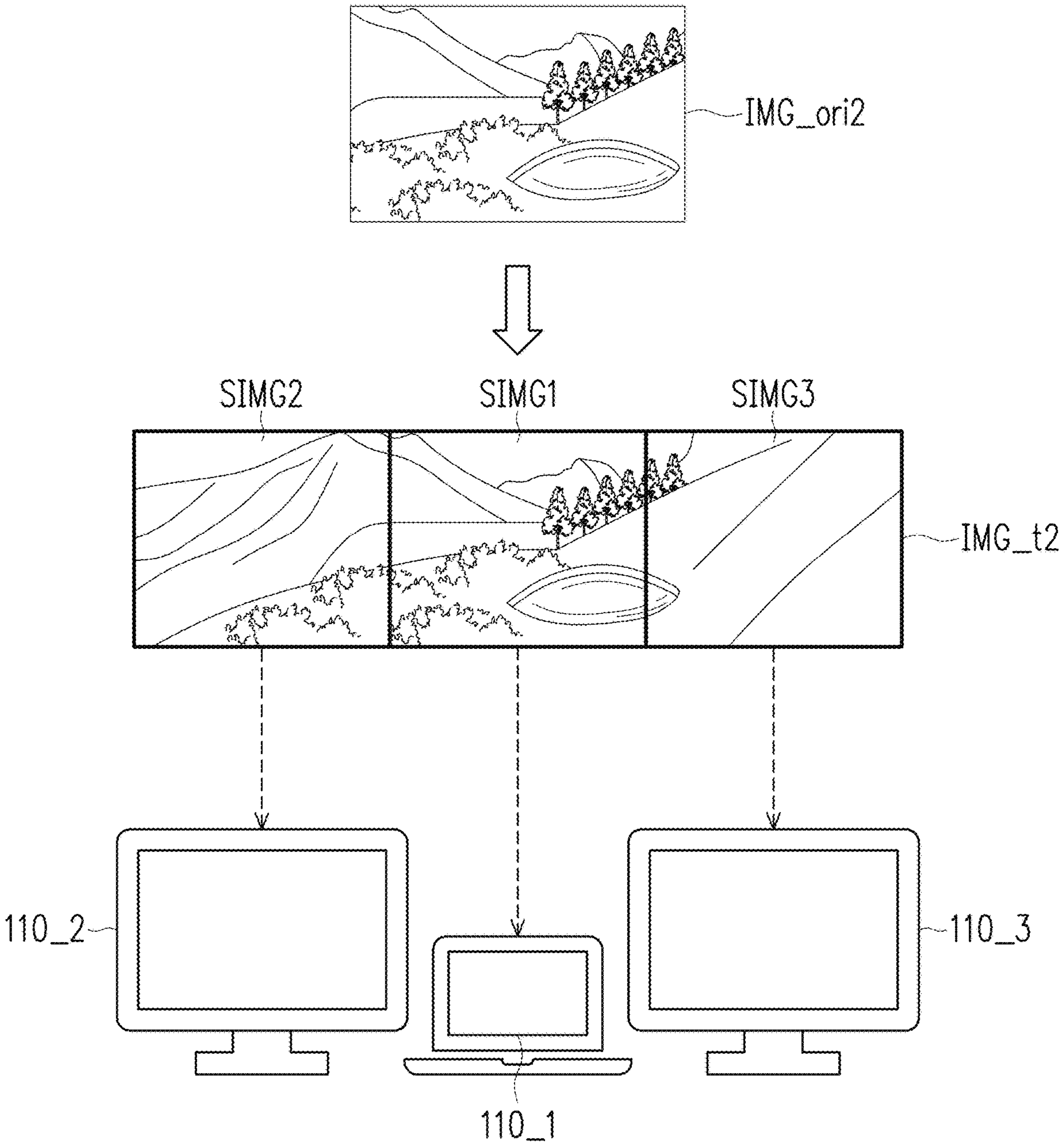
FIG. 5A to FIG. 5B are schematic diagrams of application scenarios of a plurality of displays according to an embodiment of the invention.
Figure 5B:
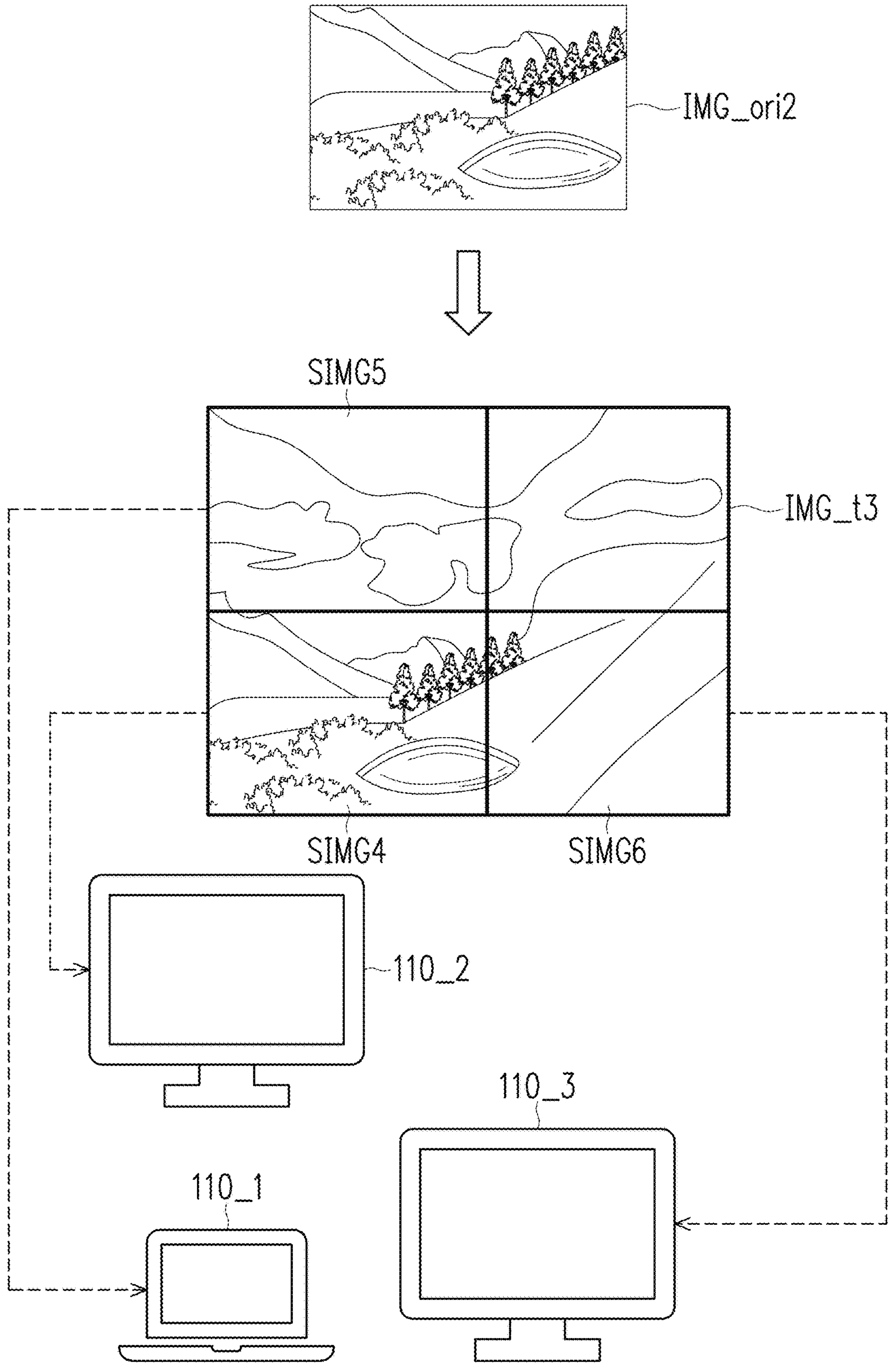

FIG. 5A to FIG. 5B are schematic diagrams of application scenarios of a plurality of displays according to an embodiment of the invention. Please refer to FIG. 5A first. Based on the display specification parameters and the arrangement layout positions of the display apparatuses 110_1 to 110_3, the processor 130 may generate a target augmented image IMG_t2 according to an original image IMG_ori2. As shown in FIG. 5A, the processor 130 generates augmented image content to the right and left of the original image IMG_ori2. Therefore, the main display apparatus 1101 may display an intermediate sub-image SIMG1 as a wallpaper. The left display apparatus 110_2 may display a left sub-image SIMG2 as a wallpaper. The right display apparatus 110_3 may display a right sub-image SIMG3 as a wallpaper.

Please refer to FIG. 5B first. Based on the display specification parameters and the arrangement layout positions of the display apparatuses 110_1 to 110_3, the processor 130 may generate a target augmented image IMG_t3 according to the original image IMG_ori2. As shown in FIG. 5B, the processor 130 generates augmented image content to the upper right of the original image IMG_ori2. Then, the processor 130 may crop out three sub-images SIMG4 to SIMG6 from the target augmented image IMG_t3. Therefore, the main display apparatus 1101 may display the lower left sub-image SIMG4 as a wallpaper. The top display apparatus 1102 may display the upper left sub-image SIMG5 as a wallpaper. The right display apparatus 1103 may display the right sub-image SIMG6 as a wallpaper.

It should be mentioned that, when the difference in pixel density (pixels per inch, PPI) of these display apparatuses 110_1 to **110_*n* is too large, if the target image resolution is determined and image cropping is performed only according to the screen resolution of the display apparatuses 110_1 to 110_*n*, the wallpaper content displayed by these display apparatuses 110_1 to 110_*n* may be misaligned (as shown in FIG. 5A, the wallpaper content of the display apparatus 110_1 and the wallpaper content of the display apparatus 1102 may not be well aligned.) Therefore, in some embodiments, the processor 130 may further determine the target image resolution and perform image cropping according to the pixel densities of the display apparatuses 110_1 to 110_*n***. An embodiment is cited below for detailed description.

Figure 6:
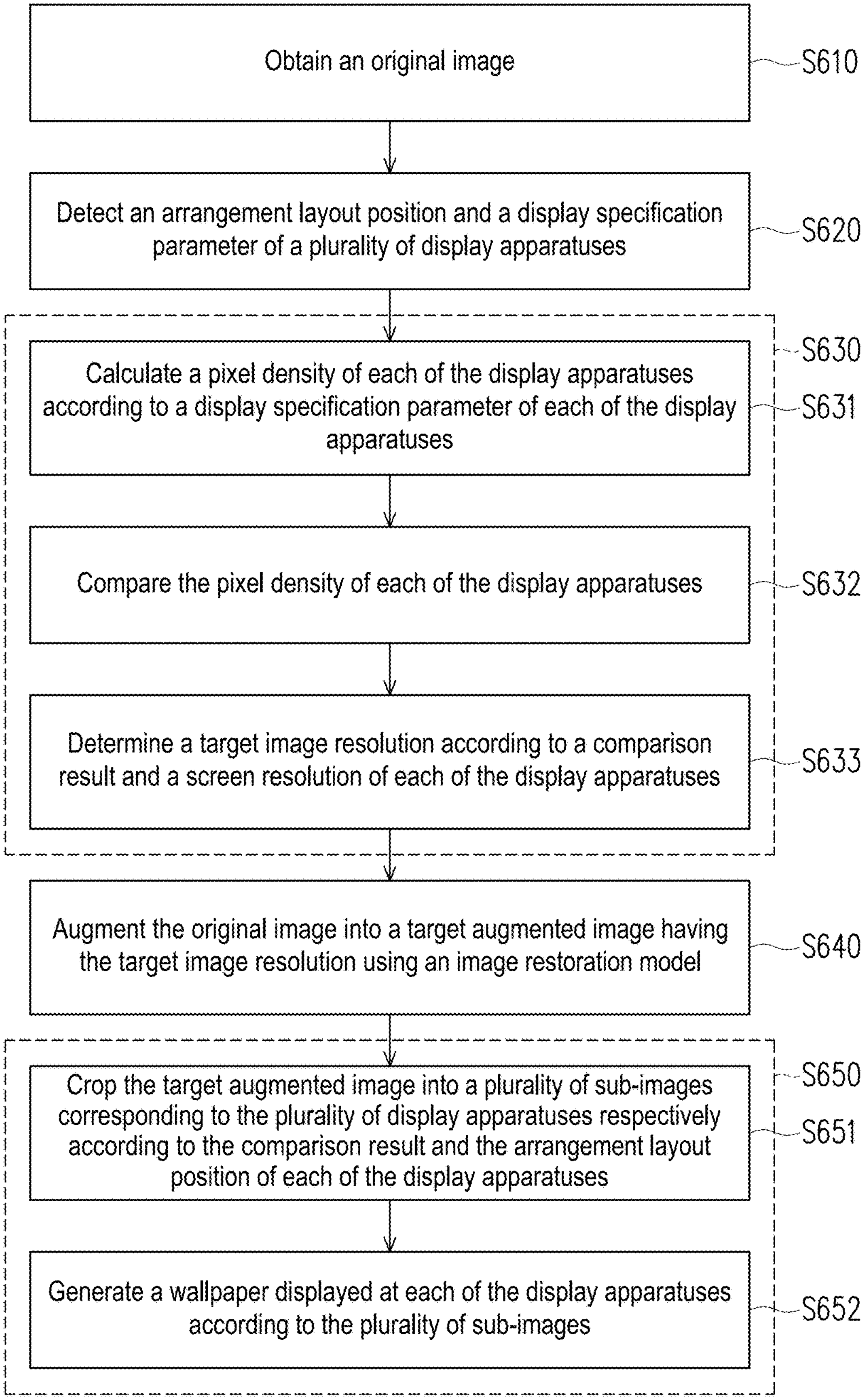
FIG. 6 is a flowchart of a wallpaper generation method according to an embodiment of the invention.

FIG. 6 is a flowchart of a wallpaper generation method according to an embodiment of the invention, and the method flow of FIG. 6 may be implemented by each element of the electronic apparatus 100 of FIG. 1. Please refer to FIG. 1 and FIG. 6 at the same time.

In step S610, the processor 130 obtains an original image. In step S620, the processor 130 detects the arrangement layout positions and the display specification parameters of the plurality of display apparatuses 110_1 to **110_*n***. The display specification parameters include screen resolution and screen size. These steps may be described with reference to the above embodiments and are not described in detail here.

In step S630, the processor 130 determines a target image resolution according to the arrangement layout position and the display specification parameter of each of the display apparatuses 110_1 to **110_*n*. In the present embodiment, step S630 may be implemented as step S631 to step S632**.

In step S631, the processor 130 calculates the pixel density (pixels per inch, PPI) of each of the display apparatuses 110_1 to **110_*n* according to the display specification parameter of each of the display apparatuses 110_1 to 110_*n*. For example, the processor 130 may calculate the pixel density of each of the display apparatuses 110_1 to 110_*n*** according to the following formula (1).

$$PPI = \frac{d_p}{d_i} = \frac{\sqrt{w_p^2 + h_p^2}}{d_i} \qquad \text{formula 1}$$

In particular, dp is the diagonal resolution of the screen; wp is the horizontal resolution of the screen; hp is the vertical resolution of the screen; di is the actual length of the screen diagonal (in inches).

In step S632, the processor 130 compares the pixel density of each of the display apparatuses 110_1 to 110_n. In step S633, the processor 130 determines the target image resolution according to the comparison result and the screen resolution of each of the display apparatuses 110_1 to 110_n.

In some embodiments, when the pixel densities of the display apparatuses 110_1 to 110_n are all quite close, the processor 130 may determine the target image resolution only according to the screen resolution and the layout arrangement position of each of the display apparatuses 110_1 to 110_n. For example, when the display apparatuses 110_1 to 110_n are arranged horizontally, the width of the target image resolution may be the sum of the widths of the screen resolutions of the display apparatuses 110_1 to 110_n. When the display apparatuses 110_1 to 110_n are arranged vertically, the height of the target image resolution may be the sum of the heights of the screen resolutions of the display apparatuses 110_1 to 110_n.

In some embodiments, when the difference between the pixel densities of the respective display apparatuses 110_1 to 110_n is large, the processor 130 may determine the target image resolution according to the ratio relationship between the pixel densities of the display apparatuses and the screen resolution and the layout arrangement position of each of the display apparatuses 110_1 to 110_n to determine the target image resolution. That is, the processor 130 needs to determine the range of image augmentation content according to the degree of difference between pixel densities, so that a display apparatus having worse pixel density may obtain a larger range of image content for reduced display.

In some embodiments, the comparison result of pixel density includes the ratio between the pixel density of the first display apparatus and the pixel density of the second display apparatus, and the ratio is greater than or equal to 1. The processor 130 may calculate a first multiplication result of the width and the ratio of the screen resolution of the first display apparatus. Next, the processor 130 may add the first multiplication result to the width of the screen resolution of the second display apparatus to generate the width of the target image resolution. Here, the pixel density of the first display apparatus is less than the pixel density of the second display apparatus. More specifically, in some embodiments, the processor 130 may calculate a second multiplication result of the height and the ratio of the screen resolution of the first display apparatus. Then, the processor 130 may set the larger of the second multiplication result and the height of the screen resolution of the second display apparatus as the height of the target image resolution.

In another embodiment, the processor 130 may calculate a first multiplication result of the height and the ratio of the screen resolution of the first display apparatus. Next, the processor 130 may add the first multiplication result to the height of the screen resolution of the second display apparatus to generate the height of the target image resolution. Here, the pixel density of the first display apparatus is less than the pixel density of the second display apparatus. More specifically, in some embodiments, the processor 130 may calculate a second multiplication result of the width and the ratio of the screen resolution of the first display apparatus. Then, the processor 130 may set the larger of the second multiplication result and the width of the screen resolution of the second display apparatus as the width of the target image resolution.

Figure 7:
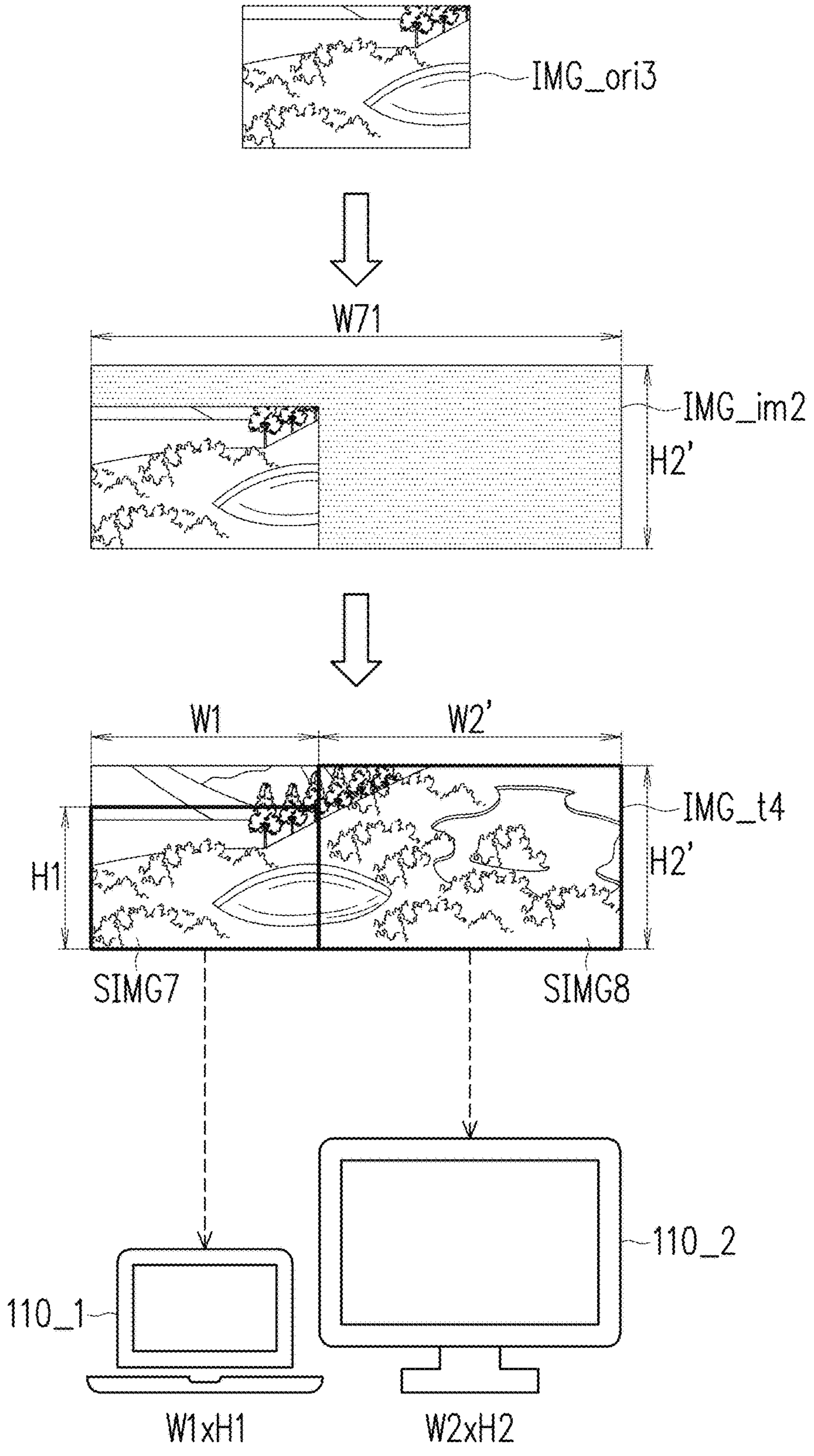
FIG. 7 is a schematic diagram of application scenarios of a plurality of display apparatuses according to an embodiment of the invention.

For example, FIG. 7 is a schematic diagram of application scenarios of a plurality of display apparatuses according to an embodiment of the invention. Please refer to FIG. 7. In order to clearly illustrate the principle of the invention, FIG. 7 takes two display apparatuses 110_1 to 110_2 horizontally arranged on the left and right as an example. Furthermore, the display specification parameter of the display apparatus 110_1 is A inches and W1×H1, and the display specification parameter of the display apparatus 1102 is B inches and W2×H2.

It is assumed that A=15.6 inches; B=24 inches; W1=W2=1920; H1=H2=1080, the processor 130 may calculate the pixel density of the display apparatus 110_1 to be approximately 142 PPI, and calculate the pixel density of the display apparatus 110_2 to be approximately 94 PPI. The ratio between the pixel density of the display apparatus 110_1 and the pixel density of the display apparatus 1102 is approximately 1.5. Therefore, since the pixel density of the display apparatus 1102 (i.e., the first display apparatus) is less than the pixel density of the display apparatus 110_1 (i.e., the second display apparatus), the processor 130 may first multiply the width W2 and the height H2 of the screen resolution of the display apparatus 110_2 by 1.5 respectively to generate a first multiplication result W'=1.5*W2 and the second multiplication result 1.5*H2. Then, a height H' of the target image resolution is equal to the second multiplication result 1.5*H2, and a width W71 of the target image resolution is equal to the second multiplication result W' plus the width W1 of the screen resolution of the display apparatus 110_1. After substituting the above assumed values, it may be known that the target image resolution is equal to 4800×1620.

Next, in step S640, the processor 130 augments the original image into a target augmented image having the target image resolution using an image restoration model. These steps may be described with reference to the above embodiments and are not described in detail here.

In step S650, the processor 130 generates a wallpaper displayed at each of the display apparatuses 110_1 to 110_n by cropping the target augmented image. In the present embodiment, step S650 may be implemented as step S651 to step S652.

In step S651, the processor 130 crops the target augmented image into a plurality of sub-images respectively corresponding to the plurality of display apparatuses 110_1 to 110_n according to the comparison result and the arrangement layout position of each of the display apparatuses 110_1 to 110_n.

In some embodiments, when the pixel densities of the display apparatuses 110_1 to 110_n are all quite close, the processor 130 may crop the target augmented image only according to the screen resolution and the layout arrangement position of each of the display apparatuses 110_1 to 110_n. For example, when the display apparatuses 110_1 to 110_n are arranged horizontally, the processor 130 may crop the target augmented image into a plurality of sub-images arranged horizontally according to only the width of the respective screen resolutions of the display apparatuses 110_1 to 110_n to obtain a plurality of sub-images of the plurality of display apparatuses 110_1 to 110_n. When the display apparatuses 110_1 to 110_n are arranged vertically, the processor 130 may crop the target augmented image into a plurality of sub-images arranged vertically according to only the height of the respective screen resolutions of the display apparatuses 110_1 to 110_n to obtain the plurality of sub-images of the plurality of display apparatuses 110_1 to 110_n.

In some embodiments, when the difference between the pixel densities of the respective display apparatuses 110_1 to 110_n is large, the processor 130 may determine the target image resolution according to the ratio between two pixel densities of adjacent display apparatuses and the screen resolution and the layout arrangement position of each of the display apparatuses 110_1 to **110_*n* to crop the target augmented image. That is, the processor 130** needs to determine the image content assigned to each of the display apparatuses according to the degree of difference between pixel densities, so that a display apparatus having worse pixel density may obtain a larger range of image content for reduced display.

In some embodiments, the comparison result includes the ratio between the pixel density of the first display apparatus and the pixel density of the second display apparatus, and the ratio is greater than or equal to 1. That is, the larger of the pixel density of the first display apparatus and the pixel density of the second display apparatus serves as the numerator of the ratio, and the smaller of the pixel density of the first display apparatus and the pixel density of the second display apparatus serves as the denominator of the ratio.

In some embodiments, the pixel density of the first display apparatus is less than the pixel density of the second display apparatus. Accordingly, the image resolution of the second sub-image corresponding to the second display apparatus is equal to the screen resolution of the second display apparatus, and the image resolution corresponding to the first sub-image of the first display apparatus is equal to the screen resolution of the first display apparatus multiplied by the ratio.

For example, please refer again to FIG. 7. After the processor 130 determines the target image resolution W71×H'2, the processor 130 may generate an input mask image IMG_im2 including the original image IMG_ori3 and the mask block. Then, the processor 130 may generate a target augmented image IMG_t4 according to the input mask image IMG_im2 using an image restoration model. Next, the processor 130 may crop out sub-images SIMG7 to SIMG8 from the target augmented image IMG_t4 according to the ratio between pixel densities and the respective screen resolutions of the display apparatuses 110_1 to 1102. In particular, since the pixel density of the display apparatus 1102 (i.e., the first display apparatus) is less than the pixel density of the display apparatus 1101 (i.e., the second display apparatus), the image resolution of the sub-image SIMG7 obtained by the processor 130 is equal to the screen resolution of the display apparatus 110_1. Furthermore, the image resolution of the sub-image SIMG8 obtained by the processor 130 is equal to the screen resolution of the display apparatus 110_2 multiplied by a ratio of 1.5. It is assumed that A=15.6; B=24; W1=W2=1920; H1=H2=1080, then, the image resolution of the sub-image SIMG7 of the display apparatus 110_1 is 1920×1080, and the image resolution of the sub-image SIMG8 of the display apparatus 110_2 is 2880×1620.

In step S652, the processor 130 generates a wallpaper displayed at each of the display apparatuses 110_1 to **110_*n* according to a plurality of sub-images. In some embodiments, the processor 130 performs an image reduction process on the first sub-image corresponding to the first display apparatus according to the screen resolution of the first display apparatus to obtain the wallpaper of the first display apparatus. That is, the processor 130 may perform a reduction process on the sub-image of the display apparatus having worse pixel density to generate the final wallpaper. Taking FIG. 7 as an example, the processor 130 may display the 1920×1080 sub-image SIMG7 as the wallpaper of the display apparatus 110_1. Moreover, the processor 130 may perform an image reduction process on the 2880×1620 sub-image SIMG8 to obtain a 1920×1080 wallpaper displayed by the display apparatus 110_2. Accordingly, the contents of the display wallpaper of the display apparatus 110_1 and the display wallpaper of the display apparatus 1102** may be aligned.

Based on the above, in an embodiment of the invention, the original image may be augmented into the target augmented image having the target image resolution using the image restoration model, wherein the target image resolution is determined according to the arrangement layout position and the display specification parameter of each of the display apparatuses. Therefore, the target augmented image may be cropped based on the arrangement layout position and the display specification parameter of each of the display apparatuses to generate the wallpaper displayed at each of the display apparatuses. Accordingly, wallpaper images that match the resolution and the layout configurations of the plurality of display apparatuses may be dynamically generated. The user no longer needs to perform time-consuming manual image editing or image searching, thereby improving user experience. Moreover, in an embodiment of the invention, the wallpaper content suitable for each of the display apparatuses may be generated based on the difference between the pixel densities of these display apparatuses. Therefore, the aesthetics and alignment effect of the wallpaper displayed by these display apparatuses may be improved.

What is claimed is:

1. A wallpaper generation method, the method comprising:

obtaining an original image;

detecting an arrangement layout position and a display specification parameter of a plurality of display apparatuses;

determining a target image resolution according to the arrangement layout position and the display specification parameter of each of the plurality of display apparatuses;

augmenting the original image into a target augmented image having the target image resolution using an image restoration model; and generating a wallpaper displayed at each of the plurality of display apparatuses by cropping the target augmented image, wherein the display specification parameter comprises a screen resolution and a screen size, wherein the step of determining the target image resolution according to the arrangement layout position and the display specification parameter of each of the plurality of display apparatuses comprises:

calculating a pixel density (pixels per inch, PPI) of each of the plurality of display apparatuses according to the display specification parameter of each of the plurality of display apparatuses;

comparing the pixel density of each of the plurality of display apparatuses; and determining the target image resolution according to a comparison result and the screen resolution of each of the plurality of display apparatuses.

2. The wallpaper generation method of claim 1, wherein the step of augmenting the original image into the target augmented image having the target image resolution using the image restoration model comprises:

determining an input mask image comprising a mask block and the original image according to the arrangement layout position of each of the plurality of display apparatuses and the target image resolution; and restoring the input mask image to the target augmented image using the image restoration model.

3. The wallpaper generation method of claim 2, wherein the step of restoring the input mask image to the target augmented image using the image restoration model comprises:

performing an image scaling process on the input mask image to generate a scaled mask image;

inputting the scaled mask image to the image restoration model to obtain a restored image; and performing another image scaling process on the restored image to generate the target augmented image having the target image resolution.

4. The wallpaper generation method of claim 1, wherein the plurality of display apparatuses comprise a first display apparatus and a second display apparatus, the comparison result comprises a ratio between the pixel density of the first display apparatus and the pixel density of the second display apparatus, the ratio is greater than or equal to 1, and the step of determining the target image resolution according to the comparison result and the screen resolution of each of the plurality of display apparatuses comprises:

calculating a first multiplication result of a width of the screen resolution of the first display apparatus and the ratio, wherein the pixel density of the first display apparatus is less than the pixel density of the second display apparatus; and adding the first multiplication result to a width of the screen resolution of the second display apparatus to generate a width of the target image resolution.

5. The wallpaper generation method of claim 4, wherein the step of determining the target image resolution according to the comparison result and the screen resolution of each of the plurality of display apparatuses further comprises:

calculating a second multiplication result of a height of the screen resolution of the first display apparatus and the ratio; and setting a larger of the second multiplication result and the height of the screen resolution of the second display apparatus as a height of the target image resolution.

6. The wallpaper generation method of claim 1, wherein the step of generating the wallpaper displayed at each of the plurality of display apparatuses by cropping the target augmented image comprises:

cropping the target augmented image into a plurality of sub-images respectively corresponding to the plurality of display apparatuses according to the comparison result and the arrangement layout position of each of the plurality of display apparatuses; and generating the wallpaper displayed at each of the plurality of display apparatuses according to the plurality of sub-images.

7. The wallpaper generation method of claim 6, wherein the plurality of display apparatuses comprise a first display apparatus and a second display apparatus, the comparison result comprises a ratio between the pixel density of the first display apparatus and the pixel density of the second display apparatus, the ratio is greater than or equal to 1, the pixel density of the first display apparatus is less than the pixel density of the second display apparatus, an image resolution corresponding to a second sub-image of the second display apparatus is equal to the screen resolution of the second display apparatus, and an image resolution corresponding to a first sub-image of the first display apparatus is equal to the screen resolution of the first display apparatus multiplied by the ratio.

8. The wallpaper generation method of claim 6, wherein the pixel density of the first display apparatus is less than the pixel density of the second display apparatus, and the step of generating the wallpaper displayed at each of the plurality of display apparatuses according to the plurality of sub-images comprises:

performing an image reduction process on a first sub-image corresponding to the first display apparatus to obtain the wallpaper of the first display apparatus according to the screen resolution of the first display apparatus.

9. An electronic apparatus, comprising:

a storage apparatus recording a plurality of commands; and at least one processor coupled to the storage apparatus and configured to:

obtain an original image;

detect an arrangement layout position and a display specification parameter of a plurality of display apparatuses, wherein the display specification parameter comprises a screen resolution and a screen size;

determine a target image resolution according to the arrangement layout position and the display specification parameter of each of the plurality of display apparatuses by:

calculating a pixel density (pixels per inch, PPI) of each of the plurality of display apparatuses according to the display specification parameter of each of the plurality of display apparatuses;

comparing the pixel density of each of the plurality of display apparatuses; and determining the target image resolution according to a comparison result and the screen resolution of each of the plurality of display apparatuses;

augment the original image into a target augmented image having the target image resolution using an image restoration model; and generate a wallpaper displayed at each of the plurality of display apparatuses by cropping the target augmented image.

* * * * *